United States Patent [19]

Roberts, Sr.

[11] 4,398,185
[45] Aug. 9, 1983

[54] SIMPLE AND RUGGED FISHING ALARM

[76] Inventor: Joseph M. Roberts, Sr., P.O. Box 2383, Alameda, Calif. 94501

[21] Appl. No.: 223,439

[22] Filed: Jan. 8, 1981

[51] Int. Cl.³ ............................................. A01K 97/12
[52] U.S. Cl. ...................................... 340/573; 43/17
[58] Field of Search ...................... 340/573; 43/16, 17, 43/17.5, 17.6

[56] References Cited

U.S. PATENT DOCUMENTS

| 963,654 | 7/1910 | Schindler . |
|---|---|---|
| 2,302,337 | 11/1941 | Mantell . |
| 2,446,427 | 10/1944 | Linder . |
| 2,549,694 | 2/1949 | Leyda . |
| 2,858,635 | 9/1955 | Haeusler . |
| 2,995,854 | 1/1959 | Dixon . |
| 3,053,003 | 9/1960 | Barnes . |
| 3,134,187 | 5/1964 | Blakely . |
| 3,250,036 | 9/1964 | Wenger . |
| 3,521,393 | 7/1968 | Gordon . |
| 3,600,836 | 8/1971 | Miyamae . |
| 3,702,513 | 11/1972 | Watts . |
| 3,878,635 | 4/1975 | Trosper et al. . |
| 3,959,910 | 6/1976 | Montgomery . |
| 4,118,882 | 10/1978 | Gorsky . |
| 4,178,712 | 12/1979 | Williams . |
| 4,195,433 | 4/1980 | Engman . |
| 4,202,125 | 5/1980 | Kovacs . |
| 4,202,126 | 5/1980 | Pietrenka . |
| 4,209,930 | 7/1980 | Boynton . |
| 4,214,394 | 7/1980 | Shogan . |
| 4,217,720 | 8/1980 | Karr . |

*Primary Examiner*—Glen R. Swann, III
*Attorney, Agent, or Firm*—Flehr, Hohbach, Test, Albritton & Herbert

[57] ABSTRACT

A fishing alarm which is simple, economical to fabricate, and rugged includes an injection molded housing with a battery and alarms mounted in the housing. The battery, alarm, electrical interconnect, and switch actuator are readily mounted in the housing. The switch includes a planar member with two conductive layers on one major surface. A rotatable pin extends through the planar member with a wiper blade fastened to one end of the pin in contact with one conductive layer and rotatable into contact with the other conductive layer. A lever is attached to the other end of the pin and extends through the housing. A fishing line engages the lever and the pull on the line rotates the pin and wiper blade to actuate the alarm. A manually operable screw engages the pin or planar member to establish drag on the switch.

10 Claims, 11 Drawing Figures

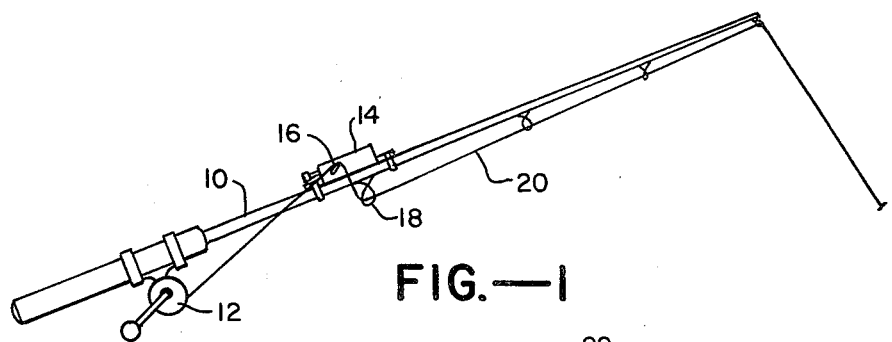
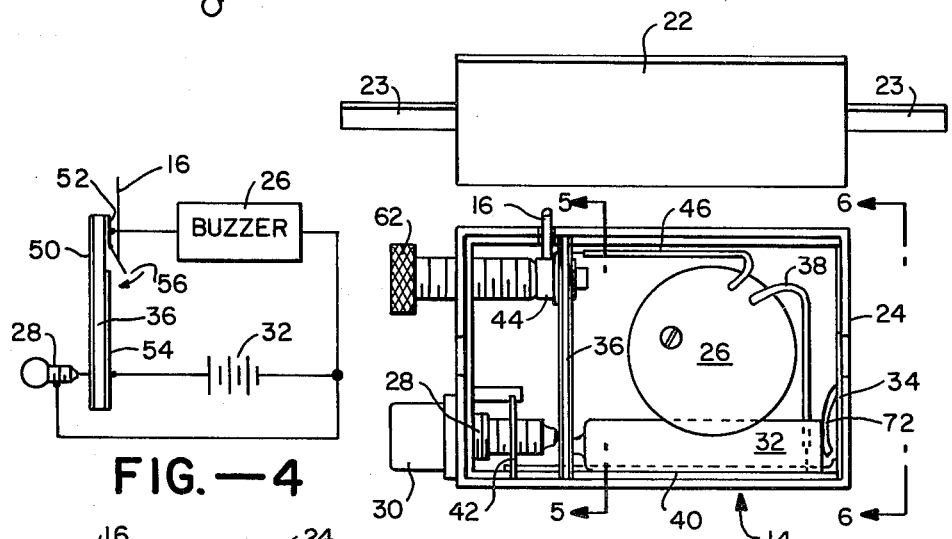
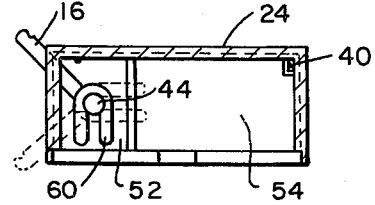
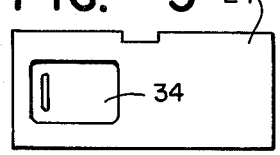
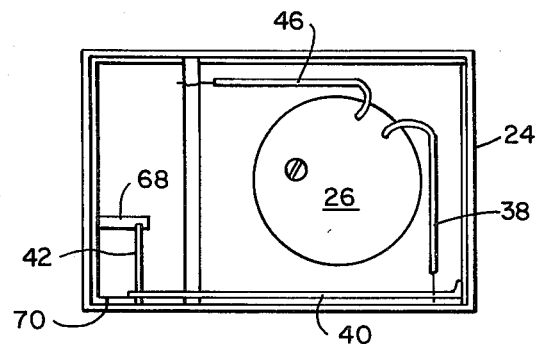
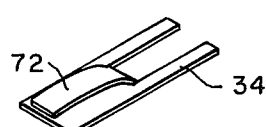

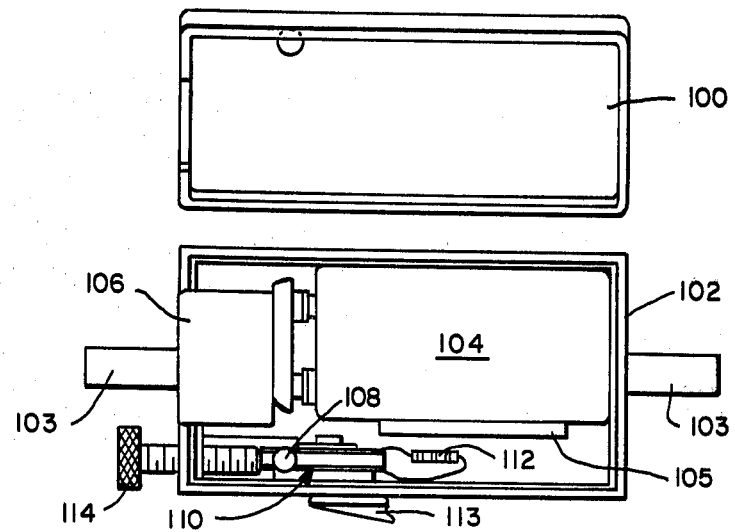
FIG.—8
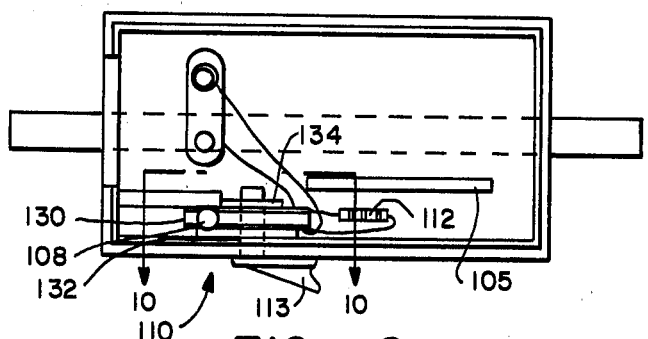
FIG.—9
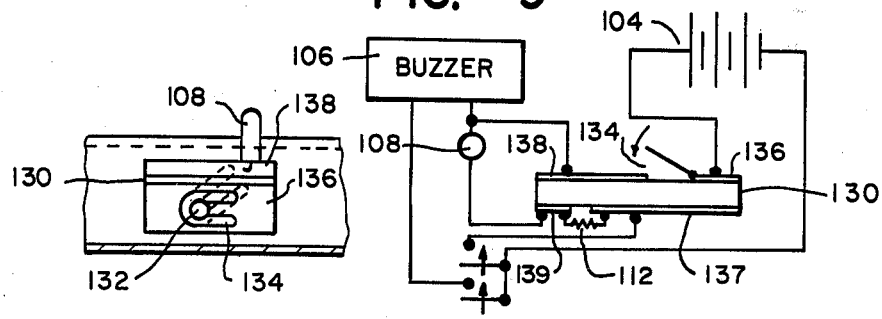
FIG.—10  FIG.—11

SIMPLE AND RUGGED FISHING ALARM

This invention relates generally to fishing apparatus, and more particularly the invention relates to an alarm for use with fishing apparatus.

Described in the prior art are numerous alarm devices for use with fishing apparatus and which respond to the pull of a fish. Some of the devices are mounted directly on the fishing apparatus such as the rod or pole while others are separate from the apparatus and may provide a support for the rod or pole. All of these devices typically respond to pull on the fishing line or flexing of the rod to initiate a sound or light alarm.

Known alarm devices usually have limitations in construction or in use. Many are bulky, relatively complex, and expensive. Others are restricted in application and relatively ineffective in use. The triggering of the alarm can cause abrasion of the fishing line, and deactivation of the alarm can be cumbersome.

Accordingly, an object of the present invention is an improved alarm for use with fishing apparatus and the like.

Another object of the invention is a fishing alarm which is simple in construction, rugged, and inexpensive.

Still another object of the invention is a fishing alarm which is readily combined with fishing apparatus and easily operated. Briefly, in accordance with the invention an alarm device includes a housing with an electrical alarm means mounted therein. A battery is provided within the housing with means connecting a first terminal of the battery to a terminal of the alarm means. Switch means is mounted in the housing and switchably electrically connects a second terminal of the battery to a second terminal of the alarm means. The switch means includes a rotatable arm extending from the housing and responsive to the fishing line for actuating the alarm. Means is also provided for adjusting drag on the rotatable arm whereby the force required to actuate the alarm can be varied. Preferably the alarm means includes an electrical buzzer and an electrical lamp.

More particularly, the switch means includes a planar member having two spaced conductive layers on a major surface. One of the spaced conductive layers electrically contacts the battery and the other of the spaced conductive layers electrically contacts the alarm means. The switch means includes contact means attached to the rotatable arm for electrically interconnecting the two spaced conductive layers upon rotation of the arm.

The switch means further preferably includes a pin member extending through the planar member with the rotatable arm being mounted on the pin member. The contact means may comprise a wiper blade which fstenes to the pin and prevents removal thereof from the planar member.

In one embodiment the switch means further includes a formed metal member having a threaded portion at one end for receiving an electrical lamp and a contact portion on the other end with means electrically interconnecting the contact portion and the first terminal of the battery. The means for electrically interconnecting the contact portion to the first terminal of the battery preferably comprises a movable metal plate in the housing for accessing the battery.

Advantageously, the housing comprises an injection molded material with the planar member, the formed metal member, and the movable metal plate being mounted in the housing by press fit thus simplifying the assembly of the alarm device.

The housing may further include a base on a major surface of the housing with the base including mounting lugs extending from opposite ends for attaching the alarm device to a fishing rod.

The invention and objects and features thereof will be more readily apparent from the following detailed description and appended claims when taken with the drawing, in which:

FIG. 1 is an illustration of fishing apparatus with an alarm in accordance with the present invention mounted thereon.

FIG. 2 is a bottom view of one embodiment of a fishing alarm in accordance with the present invention with the base removed.

FIG. 3 is the bottom view of a fish alarm shown in FIG. 2 with components removed to further illustrate the construction thereof.

FIG. 4 is an electrical schematic of the fish alarm of FIG. 2.

FIG. 5 is section view of the fish alarm of FIG. 2 taken along the lines 5—5.

FIG. 6 is an end view of the fish alarm of FIG. 2 taken along the line 6—6.

FIG. 7 is a perspective view of a battery cover in the alarm of FIG. 2.

FIG. 8 is a top view of another embodiment of a fish alarm in accordance with the invention with the cover removed.

FIG. 9 is a top view of the fish alarm of FIG. 8 with components removed to further illustrate the construction.

FIG. 10 is a section view of the fish alarm of FIG. 9 taken along the line 10—10.

FIG. 11 is an electrical schematic of the fish alarm of FIG. 8.

Referring now to the drawing, FIG. 1 is an illustration of a fishing rod 10 and reel 12 with a fishing alarm 14 in accordance with one embodiment of the invention mounted on rod 10. As will be described further hereinbelow, lugs extend from both ends of the alarm which can be fastened to the rod by tape or other suitable means. The alarm 14 includes a movable lever 16 extending therefrom, and the alarm 14 is mounted on rod 10 near a lineguide or eyelet 18 with the fishing line 20 extending from the eyelet 18 over the lever 16 and thence to the reel 12. As will be described, the pull of a fish on the line 20 actuates the alarm 14 by moving lever 16 downwardly. The alarm is then readily deactivated by returning the lever 16 to the off position.

FIG. 2 is a bottom view of one embodiment of the alarm 14 with the base 22 and integral mounting lugs 23 removed to show the components of the alarm within housing 24. In this embodiment an electrical buzzer 26 is mounted in the top surface of housing 24 and an electric lamp 28 extends through one wall of housing 24 inside of a lamp lens 30. A battery 32 is mounted in housing 24 with the cathode engaging a metal cover 34 which also functions as a slidable door for removing the battery 32. The anode of battery 32 contacts a conductive layer on planar member 36.

An insulated electrical wire 38 contacts a formed metal member 40 which electrically contacts the cathode of battery 32. The formed member 40 includes a planar portion 42 which threadably receives the light bulb 28 and forms an electrical contact therewith. The bulb 28 also contacts a conductive layer on one surface of the planar member 36.

The lever 16 extends through one wall of housing 24 and is mounted in a pin 44 which extends through the planar member 36. Preferably, the lever and pin are a unitary molded part.

An insulated electrical wire 46 connects buzzer 26 to conductive layers on either side of the planar member 36.

FIG. 3 is a view of the alarm device of FIG. 2 with parts thereof removed to further illustrate the construction. As previously described, the buzzer 26 is mounted in the top surface of the housing 24 and the formed metal piece 40 includes a planar portion 42 for threadably receiving a lamp. Wire 38 contacts member 40 and wire 46 includes a portion for contacting the conductive layers 50 and 52 of the planar member 36. In accordance with a feature of this embodiment of the invention, the formed member 40 is mounted in the housing 24 in press fit. The ends of the planar portion 42 engage a slot in portion 68 and the recess 70 of the housing 24. Advantageously, the housing 24 and the portions 68 and 70 are injection molded to minimize manufacturing costs. The buzzer 26 extends through a hold in the housing 24 and is held in place by a heat weld or solvent process.

FIG. 4 is an electrical schematic of the alarm 14 shown in FIG. 2. The planar member 36 includes a continuous conductive layer 50 on one surface which is electrically interconnected with a first conductive layer 52 on the opposite surface. The buzzer 26 and lamp 28 electrically contact the conductive layers 50, 52. Battery 32 contacts a second conductive layer 54 on a surface of the planar member 36, and a switch 56 actuated by the lever 16 connects the segments 52 and 54 for actuating the alarm.

In accordance with one feature of the invention the switch 56 includes a wiper element 60 fastened to the pin 44 extending through the planar member 36. This is illustrated in FIG. 5 which is a section view of the alarm of FIG. 2 taken along the line 5—5. As shown in this view a U-shaped wiper element 60 engages pin 44 and electrically contacts the conductive segment 52. Upon movement of the lever 16, as indicated, the wiper element 60 rotates into engagement with the conductive segment 54 (as shown by dotted lines). Thus, the wiper element 60 maintains the pin in position through the planar member 36 and also functions as the electrical switch contact in interconnecting the conductive layers 52 and 54 upon movement of the lever 16 in response to the pull of a fish on the fishing line.

Referring again to FIG. 2, the drag on the pin 44 can be adjusted by a manually operated screw 62 extending through the housing 24 and engaging the pin 44. Thus, the necessary pull on the fishing line to actuate the alarm can be varied.

FIG. 6 is an end view of the alarm device of FIG. 2 taken along the line 6—6 and further illustrates the slidable cover 34 in the end wall of the housing 24. The cover 34 is made of suitable electrically conductive material such as spring steel. FIG. 7 is a perspective view of the cover 34 which includes a finger portion 72 formed to engage the battery in forced contact to facilitate electrical contact therewith.

In the embodiment of FIGS. 2-7, the alarms are preferably operated by a 1.5 volt DC battery, size AAA. The housing and base are preferably manufactured using plastic in a conventional injection molding process. The base is permanently fastened to the housing by solvent or heat weld process. A hole can be provided through the base to access a sound adjustment screw in the buzzer. Similarly, the switch pin and drag screw can be injection molded from plastic. The planar member may be made from standard 1/16 inch copper coated circuit board with the two conductive layers 52 and 54 on one side provided by forming a slot through the copper layer.

FIGS. 8-11 illustrate another embodiment of the fish alarm in accordance with the invention. FIG. 8 is a top view of the alarm with the cover 100 removed to show the inside of housing 102. In this embodiment the lugs 103 are integral parts of the housing 102. A 9 volt battery 104 is positioned in housing 102 along with a buzzer 106 and a light emitting diode 108. Electrical wires interconnect battery 104 and buzzer 106 to conductive layers on a switch 110; light emitting diode 108 is preferably mounted on the switch 110 with one lead soldered to a conductive layer and resistor 112 interconnecting another lead of the light emitting diode to a conductive layer. The resistor and light emitting diode can be integral components. Further, a flasher can be included with the light emitting diode. Switch 110 is actuated by the lever 113. A screw 114 extends through one end of housing 102 and establishes the drag on switch 110.

FIG. 9 is a top view of the alarm of FIG. 8 with components thereof removed to further illustrate the switch 110. Similar to the embodiment of FIG. 2, the switch includes a planar member 130 having two conductive layers on one major surface and two conductive layers on an opposite major surface. A in 132 extends through housing 102 with lever 113 attached to one end of the pin and a wiper contact 134 fastened to the opposite end of the pin for maintaining the pin in position and for closing the switch. Drag on the switch is established by the screw 114 in FIG. 8 engaging the planar member 130 which then exerts pressure on the pin 132.

FIG. 10 is a side view of the switch 110 taken along the lines 10—10 of FIG. 9 and further illustrates the U-shaped wiper member 134 fastened to one end of the pin 132 and electrically contacting the conductive segment 136 on the planar member 130. When the lever 113 is moved due to the pull on the fishing line, the wiper 134 moves into contact with the second conductive layer 138 whereby the conductive layers 136 and 138 are electrically interconnected. Light emitting diode 108 is mounted on the planar member with one lead soldered to conductive layer 138.

FIG. 11 is an electrical schematic of the fishing alarm of FIG. 8. The negative terminal of battery 104 and one lead of buzzer 106 are connected to conductive layer 137 on planar member 130, and the light emitting diode 108 is connected through resistor 112 to layer 139. The positive terminal of battery 104 is connected to layer 136 of switch 110, the conductive layer 138 is connected to the buzzer 106 and to light emitting diode 108. Wiper 134 interconnects layers 136 and 138 to energize the buzzer and light emitting diode. The interconnection of buzzer 106 and light emitting diode 108 to conductive layers 137 and 139 can be through a two pole, three way switch whereby either the buzzer 106 or the light emitting diode 108, or both, can be disconnected from the circuit.

In this embodiment the cover 100 snaps into engagement with the housing 102, and the cover is removable for access to the battery. Again, the cover and housing are preferably injection molded. The switch 110 is similar to switch 56 of the first embodiment.

Fishing alarms in accordance with the present invention have proved to be easily manufactured and economical. The alarms are rugged and dependable as required for outdoor use, and the switch mechanism is readily activated and deactivated in use. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. An alarm device for use with fishing apparatus and the like comprising a housing,
    electrical alarm means including an electrical buzzer and an electrical light mounted in said housing;
    an electrical battery mounted in said housing,
    means electrically connecting a first terminal of said battery to a terminal of said alarm means,
    switch means mounted in said housing and switchably electrically connecting a second terminal of said battery to a second terminal of said alarm means, said switch means including a rotatable arm extending from said housing and responsive to a fishing line for actuating said alarms,
    a planar member having two spaced conductive layers on a major surface, one of said spaced conductive layers electrically contacting said battery and the other of said spaced conductive layers electrically contacting said alarm means, a wiper blade operably connected to said rotatable arm for electrically interconnecting said spaced conductive layers,
    a pin extending through said planar member, said rotatable arm attached to one end of said pin on one side of said planar member and said contact means attached to the other end of said pin on the side of said major surface, and
    means for adjusting drag on said rotatable arm.

2. An alarm device as defined by claim 1 wherein said means for adjusting drag comprises a manually rotatable screw mounted in said housing and engaging said pin member.

3. An alarm device as defined by claim 2 wherein said switch means further includes a formed metal member having a threaded portion at one end for receiving an electrical lamp and a contact portion at the other end, and means for electrically interconnecting said contact portion and said first terminal of said battery.

4. An alarm device as defined by claim 3 wherein said means for electrically interconnecting said contact portion and said first terminal of said battery comprises a movable metal plate in said housing for accessing said battery.

5. An alarm device as defined by claim 4 wherein said metal plate includes an integral spring member extending therefrom for yieldably engaging said first terminal of said battery.

6. An alarm device as defined by claim 5 wherein said housing comprises an injection molded plastic and said planar member, said formed metal member, and said movable metal plate are mounted in said housing by force fit and said buzzer is mounted in a major surface of said housing.

7. An alarm device as defined by claim 6 wherein said housing further includes a base on a second major surface of said housing, said base including mounting lugs extending from opposite ends for attaching said alarm to a fishing pole.

8. An alarm device as defined by claim 2 and further including second switch means for selectively disconnecting said electrical buzzer and said electrical light from said first terminal of said battery.

9. An alarm device as defined by claim 1 wherein said means for adjusting drag comprises a manually rotatable screw mounted in said housing and enging said planar member and thereby exerting pressure on said pin member.

10. An alarm device as defined by claim 1 and further including mounting lugs integral with said housing for attaching said alarm to a fishing pole.

* * * * *